United States Patent [19]
Fukuda et al.

[11] Patent Number: 4,956,499
[45] Date of Patent: Sep. 11, 1990

[54] POLYARYLENE THIOETHER COMPOSITION FOR MOLDING

[75] Inventors: Makoto Fukuda; Sirou Suzuki; Toshio Hosokawa; Yo Iizuka; Yukichika Kawakami; Zenya Shiiki, all of Iwaki, Japan

[73] Assignees: Kureha Kagaku Kogyo Kabushiki Kaisha, Tokyo; Polyplastics Co., Ltd., Osaka, both of Japan

[21] Appl. No.: 175,250

[22] Filed: Mar. 30, 1988

[30] Foreign Application Priority Data

Mar. 30, 1987 [JP] Japan .................. 62-77021

[51] Int. Cl.$^5$ ............................................. C08L 81/02
[52] U.S. Cl. ................................... 524/500; 524/609; 525/537
[58] Field of Search ................... 525/537; 524/500

[56] References Cited

U.S. PATENT DOCUMENTS

| 4,645,826 | 2/1987 | Iizuka et al. | 525/537 |
| 4,659,789 | 4/1987 | Katto et al. | 528/388 |
| 4,820,759 | 4/1989 | Ichikawa et al. | 525/537 |

FOREIGN PATENT DOCUMENTS

| 52-149348 | 12/1977 | Japan . | |
| 53-022363 | 3/1978 | Japan . | |
| 53-066565 | 8/1978 | Japan . | |
| 55-127002 | 10/1980 | Japan . | |
| 11357 | 1/1984 | Japan | 525/537 |
| 59-223753 | 12/1984 | Japan . | |
| 1087752 | 5/1986 | Japan | 525/537 |
| 62-240359 | 9/1987 | Japan . | |
| 63-063721 | 3/1988 | Japan . | |
| 63-063722 | 3/1988 | Japan . | |
| 63-068638 | 3/1988 | Japan . | |

Primary Examiner—John C. Bleutge
Assistant Examiner—David W. Woodward
Attorney, Agent, or Firm—Oblon, Spivak, McClelland, Maier & Neustadt

[57] ABSTRACT

Disclosed herein are (1) a composition which is prepared by combining 0.2 to 90 parts by weight of a crosslinked polyarylene thioether having a melt viscosity of $5 \times 10^5$ to $1 \times 10^9$ poise, which becomes gel under melting, with 100 parts by weight of a resin consisting of polyarylene thioether, which has a repeating unit of

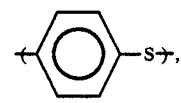

as the main constituent, having a melt viscosity of 10 to $5 \times 10^4$ poise and (2) a composition of polyarylene thioether for molding, which is prepared by combining not more than 400 parts by weight of a fibrous filler and/or an inorganic filler with 100 parts by weight of the above-mentioned composition (1), is excellent in an antiflash property, is high in a mechanical strength and a thermal stability and is easily processed on melt molding and can easily recycle its molded scraps.

7 Claims, No Drawings

POLYARYLENE THIOETHER COMPOSITION FOR MOLDING

BACKGROUND OF THE INVENTION

The present invention relates to a polyarylene thioether composition for molding. More concretely, the present invention relates to a composition for molding having remarkably improved anti-flash property (difficulty in occurrence of flash) and being prepared by combining a considerable amount of cross-linked polyarylene thioether which becomes gel under melting, as an anti-flash property improving agent, with the base resin of polyarylene thioether.

Polyarylene thioether (hereinafter referred to as PATE) represented by polyphenylene thioether is being used in many fields as an engineering plastic excellent in heat-resistance, non-inflammability, chemical resistance, etc. PATE is usually a crystalline polymer and, making the most of its feature, it is used particularly in the field of injection-molding, etc.

A conventional PATE as the base resin for the composition for molding is a cross-linked PATE which is prepared by curing a PATE of a relatively low molecular weight, namely, raising its apparent melt viscosity by forming cross-linked and branch-chained PATE with thermal treatment. The PATE prepared as above is excellent in processability in melt molding, such as injection molding, and has a characteristic point that it has usually an enough anti-flash property when it is injection molded.

However, on the other hand, the conventional PATE has many problems, so far. Namely, it is insufficient in mechanical strength, is brittle and is severely colored in thermal treatments. Moreover, because the time-dependent change of its viscosity (namely, the irreversible increase of its viscosity) during melt molding is severe, it is difficult to select the suitable molding conditions and to recycle its molded scraps. Accordingly, it is not economical to use.

On the other hand, the present inventors have developed a process for economically producing a substantially linear PATE of a high molecular weight by carrying out the addition of water and raising the temperature during polymerization (refer to U.S. Pat. No. 4,645,826).

Since a molecular weight of the substantially linear PATE obtained is sufficiently large, it can be applied to various melt-processings, such as injection molding, without being subjected to any further curing nor cross-linking during its polymerization reaction.

Such substantially linear and non cross-linked PATE has various characteristic points as follows:

(1) because of its molecular structure, it has a large mechanical strength; (2) as it is hardly colored in processing, it can easily be colored artificially; (3) as the time-dependent change of its melt viscosity during melt-molding is extremely small, its processing is easy; and (4) because of easiness in the recycle use of molded scraps, it is quite economical.

However, the composition having this substantially linear PATE of high molecular weight as a base resin, cannot have sufficient anti-flash properties on injection molding.

On the other hand, even in the composition having the conventional cross-linked PATE (aforementioned), which is usually favorable in its anti-flash property, as a base resin, there has been a problem that in injection molding for precision molded products, its anti-flash property is still insufficient.

The present inventors have extensively studied to improve the anti-flash property on injection molding the composition of non cross-linked PATE and also the anti-flash property on injection molding to prepare precision molded products from the conventional cross-linked PATE.

At first, the present inventors tried to improve the anti-flash property of the composition for injection molding by increasing the viscosity of its base resin, PATE. However, it was found out that viscosity of the composition increases in proportion to viscosity increase of the base resin and its processability (fluidity, etc.) for injection molding is damaged.

Then, the present inventors have studied tracing the method described in Japanese Patent Application Laid-Open (KOKAI) Nos. 59-223,753 (1984); 52-149,348 (1977); 55-127,002 (1980); 59-11,357 (1984); 53-66,565 (1978) and 53-22,363 (1978). Namely, the method comprises an addition of a PATE of a high viscosity, having a melt-flow value (measured by ASTM-D 1238: at 600° F. under a load of 5 kg) of about 5 to 200 g/10 minutes, or a melt viscosity, $\eta^*$, (at 310° C. under a shear rate of 5/second) of around $1\times10^3$ to $1\times10^5$ poise, to the base resin. However, it was realized that the method of adding a PATE of such viscosity, an effective improvement of the anti-flash property cannot be achieved unless a large amount of such PATE of a high viscosity is added.

Moreover, it was also found out that when a large amount of such PATE of high viscosity is added, the viscosity of the composition also increased and its processability for injection molding was remarkably damaged.

The present inventors have further studied method for effectively improving the anti-flash property of the composition without giving any substantial badinfluence on its processability for injection molding and on physical properties of the molded products. As a result, the present inventors have found that by carrying out a method which has never been considered so far, namely, a method of combining a highly cross-linked PATE (which becomes gel when melted) as an antiflash property improving agent, with the base polymer, the anti-flash property of the composition is remarkably improved without giving any substantial badinfluence on the processability and also on physical properties of the molded products. Further, side effects of the addition of this highly cross-linked PATE, for example, as a flow-orienting agent, accelerating crystallization of the composition during injection molding and, as a releasing agent, improving releasability of the molded products from molds, have also been found. Furthermore, when said cross-linked PATE is used rather in a large amount, it has also been found that not only the effects described above, but also an improvement of weld-property in injection molding is obtained.

SUMMARY OF THE INVENTION

The object of the present invention is to provide a composition of PATE for molding, which is excellent in an anti-flash property, is high in a thermal stability and is easily melt-processed and of which molded scraps can be recycled.

Further, the object of the present invention is to provide a composition of PATE for molding, which contains 0.2 to 90 parts by weight of the highly cross-linked PATE as a component B with 100 parts by weight of the basic PATE resin as a component A.

Still more, the object of the present invention is to provide a composition of PATE for molding, prepared by combining not more than 400 parts by weight of a fibrous filler and/or an inorganic filler with 100 parts by weight of the combined composition of (A+B).

DETAILED DESCRIPTION OF THE INVENTION

The composition of PATE for molding, with an improved anti-flash property, according to present invention is characterized in comprising 0–400 parts by weight of a component C and 100 parts by weight of a composition (A+B), which is prepared by combining 100 parts by weight of a component A and 0.2 to 90 parts by weight of a component B. Each of the components A, B and C is explained follows:

Component A: a resin comprising PATE having the repeating unit of

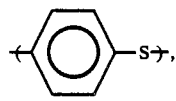

as the main constituent and having a melt viscosity (at 310° C. under a shear rate of 5/second) of 10 to $5 \times 10^4$ poise.

Component B: a cross-linked PATE having a melt viscosity (at 310° C. under a shear rate of 5/second) of $5 \times 10^5$ to $1 \times 10^9$ and being gel under melting.

Component C: a fibrous filler and/or an inorganic filler.

By a development of the present invention, a composition for molding having an improved anti-flash property compared to a component A only, has been realized while using a non cross-linked, substantially linear PATE as a base polymer. Further, it becomes possible to obtain a composition of PATE for injection molding having an excellent anti-flash property and being able to use sufficiently in the field of precision molding even when a conventional cross-linked PATE is used as a base polymer which, otherwise, still involves some trouble to use in the field.

The composition of PATE for molding according to the present invention comprises the combination of the component A as the base polymer and the component B as the anti-flash property improving agent and preferably comprises further the combination of the fibrous filler and/or an inorganic filler. The words "comprises the combination of" means that other reasonable components other than mentioned above can be contained in the composition.

Component A

The component A as the base polymer, which is the main element of the composition of the present invention, is PATE. PATE herein mentioned generally means a polymer having a repeating unit of -(-Ar-S-)-, as the main constituent (wherein Ar is an arylene group). In the present invention, the polymer having paraphenylene group as the main constituent among the arylene groups constitutes the component A.

As the polymer having paraphenylene group as the main constituent, from the standpoint of physical properties of the composition, such as heat-resistance, moldability, mechanical property, etc., the polymer containing not less than 50 mol% of paraphenylene group, preferably not less than 60 mol%, more preferably not less than 70 mol%, is desirable.

As the arylene group, (-Ar-), other than paraphenylene group, metaphenylene group,

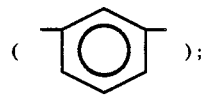

orthophenylene group,

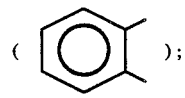

substituted phenylene group,

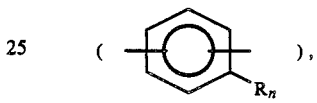

wherein R is an alkyl group (preferably an alkyl group of $C_1$ to $C_6$) or a phenyl group and n is an integer of 1 to 4; p,p'-diphenylene sulfone group,

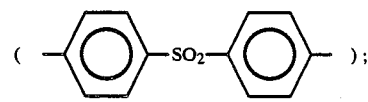

p,p'-biphenylene group,

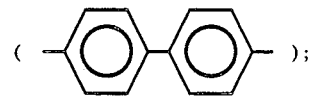

p,p'-diphenylene ether group,

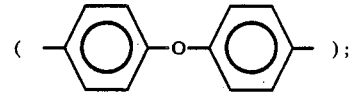

p,p'-diphenylene-carbonyl group,

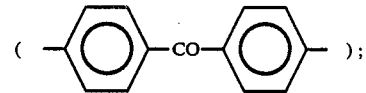

naphthalene group,

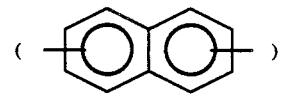

can be used.

From the view point of processability, copolymer containing different kind of repeating unit is preferable to a homopolymer consisting only of the repeating unit of

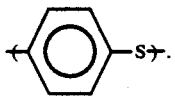

As the copolymer, a copolymer of

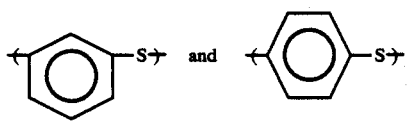

is preferred. Particularly, those containing the respective repeating units in a block form is preferred to those containing them in a random form (for example, as described in EPC Application No. 166,451-A), because the block-copolymer is remarkably excellent in physical properties (heat resistance, mechanical property, etc.) although the block- and random-copolymers are substantially equal in their processabilities. 5 to 50 mol% of repeating unit of

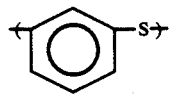

in the block copolymer is preferable and 10 to 25 mol% is particularly preferable.

As the PATE for component A in the present invention, those having substantially linear structure are preferred in respect to the processability and the physical property. The words "PATEs (those having a substantially linear structure" does not mean the polymers obtained by curing such as oxidation cross-linking or thermal cross-linking but means the polymers obtained by condensation polymerization of a monomer substantially having a bifunctional monomer as the main body. However, within a range of not substantially impairing the physical properties of molded products, for instance, a cross-linked polymer obtained by using an effective amount of a cross-linking agent (for instance, trihalobenzene) during polymerization or a thermally cross-linked polymer obtained by a high temperature curing in the presence of oxygen, may also be used according to the present invention.

The component A as a base polymer for the composition of the present invention is desired to be a polymer having a melt viscosity, $\eta^*$, (at 310° C. under a shear rate of 5/second) in the range of 10 to $5\times10^4$ poise, preferably 50 to $5\times10^4$ poise and more preferably 100 to $5\times10^4$ poise. When the melt viscosity, $\eta^*$, is below 10 poise, it is difficult to melt-process the composition because its fluidity is too high, and even if the molded product can be obtained, its mechanical strength, etc. are poor and it is not preferable. On the other hand, when the melt viscosity, $\eta^*$, is over $5\times10^4$ poise, its fluidity is poor and accordingly the melt-processing of a composition made of the component A is difficult.

PATE which meets the above conditions of the resin according to the present invention can be manufactured economically by the method described in U.S. Pat. No. 4,645,826 filed by the present inventors. In addition, a method described in U.S. Pat. No. 3,919,177 in which a polymerization aid such as a carboxylic acid salt is added in a large amount to obtain a high molecular weight PATE can also be used.

Further, as another materials for compounding, other synthetic resins, various elastomers, various additives for processing, etc. may be combined with component A.

Component B

The component B as an anti-flash property improving agent, which is one of the essential combining elements in the composition according to the present invention, is a PATE having the similar chemical structure as that of component A. Namely, the PATE has the repeating unit of $-(Ar-S)-$, (same definition of Ar as described before). However, the repeating unit of

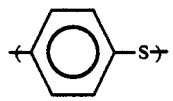

is not essential as the main constituent although is preferable.

The specifically different point of component B from component A is that component B is a cross-linked PATE, which becomes gel under melting, having a melt viscosity, $\eta^*$, (at 310° C. under a shear rate of 5/second) of $5\times10^5$ to $1\times10^9$ poise, preferably $1\times10^6$ to $1\times10^9$ poise. A melt-flow value (measured by ASTM D-1238, at 600° F. under a load of 5 kg) of the cross-linked PATE of such high viscosity is less than 1 and is difficult to exhibit it in an exact value. When $\eta^*$ is below $5\times10^5$ poises, because an improvement of anti-flash property cannot be sufficient even when a large amount of such component B is combined with component A, it is not preferable. On the other hand, when $\eta^*$ is over $1\times10^9$ poise, component B cannot easily disperse in the molten base polymer as fine particle gels during melt molding and accordingly, an improving effect of anti-flash property becomes insufficient and makes the case not preferable.

A non cross-linked PATE or lowly cross-linked PATE as an anti-flash improving agent, component B, which does not become gel under melting, dissolves compatibly into component A even if the PATEs have a high viscosity and is likely to increase melt viscosity of the composition with less effect on anti-flash property and consequently they are not preferable.

As a method for obtaining a cross-linked PATE which becomes gel under melting, a method for forming a cross-linked structure by using a cross-linking agent during polymerization, for example, a method of mixing about 0.05 mol to about 20 mol of polyhaloaromatic compound, being substituted with not less than three halogen atoms, to 100 mol to dihaloaromatic compound, further adding appropriate amounts of water and/or alkali metal carboxylic acid and polymerizing the mixture under existence of sodium disulfide and polar organic solvent at 180 to 290° C. for an appropriate period of time to obtain the polymer having necessary properties such as melt viscosity and gel forming and a method of cross-linking PATE by high temperature curing in the presence of oxygen, for example, a method of heating PATE in the presence of oxygen at the temperature of not lower than 200° C. but lower than its melting point for an appropriate period of time to obtain the polymer having necessary properties such as melt viscosity and gel forming can be used. Particularly, the PATE cross-linked during polymerization obtained by the former method is excellent in a color tone and a thermal stability as compared to the thermally cross-linked PATE obtained by the latter method, and accordingly, the former method is preferable.

The amount of combining component B in the composition for molding of the present invention is suitable in the range of 0.2 to 90 parts by weight, preferably in the range of 0.5 to 80 parts by weight, more preferably in the range of 0.5 to 70 parts by weight, particularly preferable in the range of 0.5 to 60 parts by weight, per 100 parts by weight of component A. When an amount of component B is below 0.2 part by weight, the effect of improving the anti-flash property is likely to be insufficient and on the other hand, when an amount of component B is over 90 parts by weight, a fluidity of the composition is lowered largely and the mechanical property of the molded product is likely to be lowered. Accordingly, the both cases are not preferable.

Filler

In the composition for molding of the present invention, there are a fibrous filler and/or an inorganic filler (the component C) as a preferable component although such fillers are not essential. Although, component C is not essential in view of improving an anti-flash property of the composition, these fillers are combined with component A to improve physical properties of the molded products, such as mechanical properties, heat-resistance, electrical properties, chemical-resistance, and sometimes to reduce the cost of the molded product by using the filler as an extending agent. The amount of combination of the filler is 0 to 400 parts by weight per 100 parts by weight of the mixture of components A and B, and to exhibit the effects of the filler, the combination of not less than 0.01 part and not more than 400 parts by weight is preferable, 1 to 300 parts by weight is more preferable and 10 to 250 parts by weight is still more preferable. When the amount of combination of fillers is over 400 parts by weight, the processability of the composition is remarkably damaged and is not preferable.

As a fibrous filler, filaments of glass, carbonaceous material, silicon carbide, silica, alumina, zirconia, aramide, etc. and whiskers of potassium titanate, wollastonite, calcium sulfate, carbon, boron, etc. can be mentioned.

As an inorganic filler, powders of talc, mica, kaolin, clay, glass, magnesium carbonate, magnesium phosphate, calcium carbonate, calcium silicate, calcium sulfate, calcium phosphate, silicon oxide, aluminum oxide, titanium oxide, iron oxide (including ferrite), copper oxide, zirconia, zinc oxide, silicon carbide, carbon, graphite, boron nitride, molybdenum disulfide, silicon, etc. may be mentioned.

Other materials for combination

Other than the above combining elements, other synthetic resins, various elastomers, various additives for processing, etc. can be combined with the composition.

As an other synthetic resin, a polyolefin, polyester (including aromatic polyester), polyamide (including aromatic polyamide), polyamideimide, polyimide, polyether imide, polyether sulfone, polyether ketone, polyether ether ketone, polysulfone, polycarbonate, polyacetal, polyarylene, fluorocarbon resin, epoxy resin, silicone resin, phenol resin, poly(methyl methacrylate), polystyrene ABS, etc. can be mentioned.

As an elastomer, fluorocarbon rubber, silicone rubber, polyolefin rubber, hydrogenated SBR, isoprene rubber, acryl rubber, polyester elastomer, polyamide elastomer etc. can be mentioned.

As a processing agent, antioxidant, stabilizer, anticorrosive agent, lubricant, releasing agent, coupling agent, coloring agent, anti-inflammatory agent, bubbling agent and anti-static agent can be mentioned.

PRODUCTION OF THE COMPOSITION

The composition of PATE for molding of the present invention includes the composition prepared by mixing each of the combining elements and additives as solid powder and also the composition, which is in coherent state, prepared by mixing said elements and additives under molten state. The latter composition is a representing one and is usually manufactured as pellets.

The former composition can be manufactured by uniformly mixing each of the combining elements and additives with blenders, mixers or mills. The latter composition is manufactured by molding the former composition into pellets, through melt-kneading with an extruder, etc.

USES OF THE COMPOSITION

The uses of the composition for molding according to the present invention are not necessarily limited to injection-molded products, however, the characteristic points of the composition can display most effectively in injection-molded products.

Of course, it is needless to say that the anti-flash property of the composition is quite excellent in injection molding. Furthermore, there are another features, for example, its high crystallization rate, its excellent releasability, its excellent heat stability during melt-molding, excellent mechanical properties especially weld-property in injection molding, color and dimensional stability of its molded product and easy recycle use of its molded scrap which makes its molding procedure economical. Taking advantage of these features, the composition can be applied for many fields such as electrics, electronics, precision machineries, cars and aeroplanes. Particularly, it is excellently suitable for precision machineries field.

EXPERIMENTAL EXAMPLES

Experiment 1 for Producing Polymer A-1

Into a titanium-lined autoclave, 1200 kg of N-methylpyrrolidone (NMP) and 420 kg of hydrated sodium sulfide (purity: 46.4%) were introduced and by heating the content to about 202° C., 190 kg of water were distilled out. Then, 366 kg of p-dichlorobenzene were introduced and after 5 hours of polymerization at 218° C., 90 kg of water were additionally introduced and the polymerization was performed for 1.5 hours at 260° C. and further for 4 hours at 242° C.

A slurry containing the formed polymer was obtained. The slurry was sieved through a 0.1 mm mesh screen and only a granular polymer was separated, washed with acetone and then with water to obtain a cleaned polymer. The cleaned polymer was immersed into an aqueous 2% solution of NH$_4$Cl at 40° C. for 30 minutes and then the treated polymer was washed with water and dried at 80° C. for 12 hours under a reduced pressure to obtain polymer A-1. The melt viscosity, $\eta^*$, of the obtained, non cross-linked polymer A-1 was $1 \times 10^4$ poise (hereinafter, $\eta^*$ is measured at 310° C. under a shearing rate of 5/second).

Experiment 2 for Producing Polymer A-2

Into an autoclave made of SUS 316 stainless steel, 15 kg of NMP and 4.2 kg of hydrated sodium sulfide (purity: 46.4%) were introduced, and by heating the content to about 202° C., 1.6 kg of water were distilled out. Then, 3.65 kg of p-dichlorobenzene were introduced and the polymerization was performed for 2 hours at 240° C.

By heating the slurry containing the formed polymer under a reduced pressure, NMP was distilled out. The solid containing the polymer was washed with water to remove salts and washed with acetone and further with water. The washed polymer was dried for 12 hours at 80° C. under a reduced pressure. The melt viscosity, $\eta^*$, of the obtained polymer was 100 poise.

The obtained polymer was treated with high temperature curing at 270° C. for 6 hours in an oven of air-circulation type to obtain polymer A-2 (powder). The melt viscosity, $\eta^*$, was $1 \times 10^4$ poise.

Experiment 3 for Producing Polymer A-3

Into a titanium-lined autoclave, 930 kg of NMP and 423 kg of hydrated sodium sulfide, Na$_2$S·5H$_2$O (purity: 46.07%) were introduced and by heating the content gradually to 203° C., 171 kg of water were distilled out. 5 kg of water and 44 kg of NMP were additionally introduced and then 365 kg of p-dichlorobenzene were introduced into the autoclave and after 5 hours of polymerization at 220° C., 135 kg of water was charged and the polymerization was performed at 255° C. for 4.5 hours.

After cooling the polymerization mixture, a slurry obtained was sieved through a 0.1 mm mesh screen and only a granular polymer was separated, washed with acetone and then with water and a cleaned linear polymer was obtained. The cleaned polymer was immersed into an aqueous 2% solution of NH$_4$Cl at 40° C. for 30 minutes under stirring and the treated polymer was washed with water and dried and obtained polymer A-3. The melt viscosity, $\eta^*$, of polymer A-3, which is linear, was 880 poise.

Experiment 4 for Producing Polymer B-1

Into an autoclave, 2.0 kg of NMP and 420 g of hydrated sodium sulfide (purity:46.4%) were introduced and the content was heated to about 200° C. to distill 90 g of water out. Then, 355 g of p-dichlorobenzene and 11 g of 1,2,4,5-tetrachlorobenzene were introduced into the autoclave and the polymerization was performed for 8 hours at 215° C. Then, 30 g of water were added, the temperature was raised to 250° C. in about 30 minutes, and was further polymerized for 0.3 hour at 250° C. The content was once cooled to 210° C. in 15 minutes and then heated again to 245° C. in 30 minutes. (When the polymerization mixture cooled to 210° C. it was further cooled to below 60° C. and a polymer was obtained. The melt viscosity, $\eta^*$, of the polymer was less than 10 poise and the polymer was in a state of fine powder.) After maintaining the content at 245° C. for 12 hours, the content was treated in the same manner as in Example 1 to obtain polymer B-1 which became gel under melting. The melt viscosity, $\eta^*$, of polymer B-1, cross-linked during polymerization, was $1 \times 10^7$ poise.

Experiment 5 for Producing Polymer B-2

In the same manner as in Experiment 4 for producing the polymer except for using 1,2,4,5-tetrachlorobenzene of 5.5 g, a polymer B-2, being gel under melting, was obtained. The melt viscosity, $\eta^*$, of polymer B-2, cross-linked during polymerization, was $3 \times 10^6$ poise.

Experiment 6 for Producing Polymer B-3

In the same manner as in Experiment 4 for producing the polymer except for using 1,2,4,5-tetrachlorobenzene of 0.55 g, a polymerization was carried out to obtain a polymer B-3. The melt viscosity $\eta^*$, of polymer B-3, cross-linked during polymerization, was $5 \times 10^4$ poise.

Experiment 7 for Producing Polymers B-4 to B-6

Portions of the polymer A-1 obtained in Experiment 1 were treated for 16 hours at 280° C. (for polymer B4), for 6 hours at 280° C. (for polymer B5) and for 5 hours at 270° C. (for polymer B6) in an oven of air-circulating type to obtain polymers B-4, B-5 and B-6, each being gel under melting except B-6. The melt viscosity, $\eta^*$, of each of polymers B-4, B-5 and B-6, cross-linked by thermal treatment, was as follows:

| | |
|---|---|
| Polymer B-4; | $5 \times 10^6$ poise |
| Polymer B-5; | $1 \times 10^6$ poise |
| Polymer B-6; | $5 \times 10^4$ poise |

Examples 1 to 11 and Comparative Examples 1 to 7 of Preparation of the Composition Polymers A-1 and A-3 were used as the base polymers which are non cross-linked, linear polymers.

Polymer A-2 was used as a model of a thermally cross-linked base polymer of a conventional composition for injection molding. Each of polymers B-1 to B-6 (except B-3 and B-6), which becomes gel under melting, was used as an anti-flash property improving agent for the composition.

As a preliminary blending, predetermined parts by weight of each polymer B, which is an anti-flash property improving agent, and glass fibers (13 μm in diameter and 3 mm in length, made by NIHON DENKI GLASS Co., Ltd.) were blended with 100 parts by weight of the basic polymer (polymer A). The blending was performed, first, by blending polymer A and anti-flash property improving agent (polymer B) with Henchel mixer and then further by blending glass fiber and the mixture (polymer A plus polymer B) with tanbler mixer and a powdery composition was prepared.

The powdery composition was melt blended with a twin screw kneading extruder (with a cylinder of 30 mm in diameter, made by PLASTIC KOGAKU KENKYUSHO, MODEL #BT-30) and extruded in a form of strand, rapidly cooled and cut into pellets.

Physical Properties and their Measuring Methods (1) Melt Viscosity

Melt viscosity, $\eta^*$, was measured with KOKA type flow tester, at 310° C. under a shear rate of 5/second.

(2) Anti-flash Property

A mold for the test of the anti-flash property (provided with a gap of 30 μm for flash forming) was installed to an injection molding machine (made by TOSHIBA KIKAI CO., Ltd., Model: #IS-25EV), and the injection molding was performed on each of the pellet samples under the following conditions:

(1) resin temperature of 350 to 360° C.;
(2) mold temperature of 145° C.; and
(3) holding pressures of 1,400 kg/cm² for the tests in Table 1 and 1,000 kg/cm² for the tests in Table 2.

The length of flash generated through the gaps, was measured and the shorter is the length of the flash, the more excellent is the anti-flash property of the composition. And, the sample being extremely poor in anti-flash property was evaluated as 1, the sample being extremely excellent was evaluated as 5 and the sample of conventional composition was evaluated as 3.

The results are shown in Tables 1 and 2 collectively.

Further, the mold used for the tests has a cavity of a size of 2 mm×40 mm×40 mm, and a gate of 2 mm in width was installed at the center of one of the sides of the thus formed square (a size of 40 mm×40 mm).

On the side of the square, opposing the gate, four gaps of 4 mm in width and 6 mm in length (in the direction of injection), with a clearance of 30 μm as mentioned before, have been installed as the two sets with the mutual distance of 2 mm between the two gaps of one set and with the distance of 10 mm between the two sets having the axis of injection as a center of the two sets.

(3) Mechanical Properties

An injection molding machine was equipped with the mold for the test and each sample was injection-molded under the following conditions:

(1) resin temperature of 350 to 360° C.;
(2) mold temperature of 145° C.; and
(3) holding pressure of 1,000 kg/cm².

Mechanical properties of the samples were measured in conformity to the ASTM standard and the results are shown in Table 2.

A weld tensile strength was measured as follows:

The mold for the test has two gates at each edge of a cavity for preparing a sample for tensile strength and test samples for weld properties. The samples have a welded part at around the center of the dumbell-shaped specimen, and were prepared by introducing a resin to be tested from both gates simultaneously.

To prepare a dumbell-shaped specimen for measuring conventional tensile properties (without welding part), a resin to be tested was injection molded with one gate closed. Tensile strength and tensile elongation were measured with each dumbell-shaped specimen prepared as above.

(4) Crystallinity Index

The index, Ci, was measured, using the same samples prepared by the above test (anti-flash property test), as follows:

(1) separate a crystalline scattering strength Ac and an amorphous scattering strength Aa from a wide angle X-ray diffraction pattern of each sample at $2\theta = 17$ to $23°$; and (2) calculate Ci with the following formula:

$$Ci(\%) = [Ac/(Ac+Aa)] \times 100$$

For the detail of the method, refer to "*Journal of Applied Polymer Science*, Vol. 20, p. 2541 (1976).

TABLE 1

| | Composite Material | | | | | | | | Molded Product | | |
|---|---|---|---|---|---|---|---|---|---|---|---|
| | Polymer A | | | Polymer B | | | | | | | |
| Example No. | No. | Melt Viscosity (poise) | Amount*[1] | No. | Melt Viscosity (poise) | Amount*[1] | Filler Kind | Filler Amount*[1] | Length of Flash (mm) | Anti-flash Property*[2] | Remark |
| Ex. 1 | A-1 | $1 \times 10^4$ | 100 | B-1 | $1 \times 10^7$ | 3 | GF | 66.7 | 0.26 | 5 | |
| Ex. 2 | A-1 | $1 \times 10^4$ | 100 | B-2 | $3 \times 10^6$ | 3 | GF | 66.7 | 0.39 | 4 | |
| Ex. 3 | A-1 | $1 \times 10^4$ | 100 | B-4 | $5 \times 10^6$ | 3 | GF | 66.7 | 0.25 | 5 | |
| Ex. 4 | A-1 | $1 \times 10^4$ | 100 | B-5 | $1 \times 10^6$ | 3 | GF | 66.7 | 0.42 | 4 | |
| Ex. 5 | A-1 | $1 \times 10^4$ | 100 | B-1 | $1 \times 10^7$ | 5 | GF | 66.7 | 0.20 | 5 | |
| Ex. 6 | A-1 | $1 \times 10^4$ | 100 | B-4 | $5 \times 10^6$ | 5 | GF | 66.7 | 0.20 | 5 | |
| Com. Ex. 1 | A-1 | $1 \times 10^4$ | 100 | — | — | — | GF | 66.7 | 0.65 | 2 | Control |
| Com. Ex. 2 | A-1 | $1 \times 10^4$ | 100 | B-3 | $5 \times 10^4$ | 5 | GF | 66.7 | 0.60 | 2 | Low Vis. Polymer B |
| Com. Ex. 3 | A-1 | $1 \times 10^4$ | 100 | B-6 | $5 \times 10^4$ | 5 | GF | 66.7 | 0.63 | 2 | Low Vis. Polymer B |
| Com. Ex. 4 | A-1 | $1 \times 10^4$ | 100 | B-1 | $1 \times 10^7$ | 0.1 | GF | 66.7 | 0.65 | 2 | Low Amt Polymer B |
| Com. Ex. 5 | A-1 | $1 \times 10^4$ | 100 | B-4 | $5 \times 10^6$ | 0.1 | GF | 66.7 | 0.64 | 2 | Low Amt Polymer B |
| Com. Ex. 6 | A-2 | $1 \times 10^4$ | 100 | — | — | — | GF | 66.7 | 0.50 | 3 | Conventional Model |

*[1] Part by weight;
*[2] 1 - very bad; 2 - bad; 3 - good; 4 - very good; 5 - excellent
In the Table, Vis. means viscosity, Amt means amount and GF means glass fiber.
Injection molding for the test of the anti-flash property was performed with the conditions of Temperature of the mold; 145° C.: Holding pressure; 1400 kg/cm²: Temperature of the resin; 350 to 360° C.

TABLE 2

| | Composite material | | | | | | Physical Properties of Molded Product | |
|---|---|---|---|---|---|---|---|---|
| | Polymer A | | Polymer B | | Filler | | Length of Flash (mm)*[4] | Crystallinity Index at surface (%) |
| Example No. | Code No. | Amount*[1] | Code No. | Amount*[1] | Kind | Amount*[1]*[4] | | |
| Comp. Ex. 7 | A-3 | 100 | — | — | GF | 66.7 | 0.69 | 36 |
| Ex. 7 | A-3 | 100 | B-4 | 25 | GF | 83.3 | 0.21 | 50 |
| Ex. 8 | A-3 | 100 | B-1 | 11.1 | GF | 74.1 | 0.28 | 44 |
| Ex. 9 | A-3 | 100 | B-1 | 20 | GF | 80 | 0.17 | 52 |
| Ex. 10 | A-3 | 100 | B-1 | 50 | GF | 100 | 0.15 | 48 |
| Ex. 11 | A-3 | 100 | B-1 | 60 | GF | 106.7 | 0.13 | 51 |

TABLE 2-continued

| | Physical Properties of Molded Product | | | | | |
|---|---|---|---|---|---|---|
| Example No. | Tensile Strength (kg/mm$^2$)*$^2$ | Tensile Elongation (%)*$^2$ | Weld Tensile Strength (kg/mm$^2$) | Ratio of Weld Tensile Strength/Tensile Strength (%) | Flexural Strength (kg/mm$^2$)*$^3$ | Flexural Modulus (kg/mm$^2$)*$^3$ |
| | 17.6 | 1.4 | 6.0 | 34 | 24.4 | 1,480 |
| | 17.5 | 1.5 | 7.2 | 41 | 25.1 | 1,510 |
| | 17.6 | 1.4 | 7.0 | 40 | 24.7 | 1,500 |
| | 18.4 | 1.5 | 8.1 | 44 | 26.0 | 1,550 |
| | 17.2 | 1.6 | 8.6 | 50 | 25.4 | 1,520 |
| | 17.4 | 1.5 | 8.5 | 49 | 25.6 | 1,530 |

*$^1$ part by weight
*$^2$ measured by ASTM D 638:
*$^3$ measured by ASTM D 790 Injection molding for the test of the anti-flash property was performed with the conditions of; Temperature of the mold; 145° C.: Holding pressure; 1000 kg/cm$^2$: Temperature of the resin; 350 to 360° C.:
*$^4$ the ratio of polymer/GF for all Examples are 60/40.

From the Table 2, it can be easily understood that the composition of the present invention has not only the effect of suppressing a forming of flash but also an effect of accelerating crystallization of the composition during melt molding. Furthermore, surprisingly enough, it weld properties are also improved.

What is claimed is:

1. A composition of polyarylene thioether for molding, having an improved anti-flash property, comprising (i) 100 parts by weight of the sum of components A and B, which is prepared by combining 0.2 to 90 parts by weight of component B with 100 parts by weight of component A, and (ii) 0 to 400 parts by weight of component C, component A being a resin comprising a polyarylene thioether which has a repeating unit of

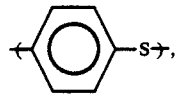

as the main constituent, having a melt viscosity, measured at 310° C. under a shear rate of 5/second, of 10 to $5 \times 10^4$ poise; component B being a cross-linked polyarylene thioether having a melt viscosity, measured at 310° C. under a shear rate of 5/second, of $5 \times 10^5$ to $1 \times 10^9$ poise and becomes a gel when it is heated; component C being a fibrous filler, a non-fibrous inorganic filler or a mixture thereof.

2. The composition for molding according to claim 1, wherein said component A is a non cross-linked and substantially linear polyarylene thioether.

3. The composition for molding according to claim 1, wherein said component B is a cross-linked polyarylene thioether which has been cross-linked during polymerization and becomes a gel when it is heated.

4. The composition for molding according to claim 1, wherein said component B is a cross-linked polyarylene thioether which has been cross-linked by curing at a high temperature and becomes a gel when it is heated.

5. The composition for molding according to claim 1, which is a composition for injection molding.

6. The composition for molding according to claim 1, wherein said component B has a melt viscosity, measured at 310° C. under a shear rate of 5/second, of $1 \times 10^6$ to $1 \times 10^9$ poise.

7. The composition for molding according to claim 1, wherein said composition contains not less than one part by weight and not more than 400 parts by weight of said component C per 100 parts by weight of the sum of said components A and B.

* * * * *